(12) United States Patent
Kuppel et al.

(10) Patent No.: US 9,893,477 B2
(45) Date of Patent: Feb. 13, 2018

(54) HOUSING AND ASSEMBLY

(71) Applicant: EATON ELECTRICAL IP GMBH & CO. KG, Schoenefeld (DE)

(72) Inventors: Klaus Kuppel, Kalenborn (DE); Karl Heinz Arndt, Niederkassel (DE); Anthony Edward Develice, Mukilteo, WA (US); Steven Dale Rees, Bothell, WA (US); Alex Brandon Dexter, Lake Stevens, WA (US)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 0 days.

(21) Appl. No.: 15/323,741

(22) PCT Filed: Jun. 29, 2015

(86) PCT No.: PCT/EP2015/064754
§ 371 (c)(1),
(2) Date: Jan. 4, 2017

(87) PCT Pub. No.: WO2016/005222
PCT Pub. Date: Jan. 14, 2016

(65) Prior Publication Data
US 2017/0141520 A1 May 18, 2017

(30) Foreign Application Priority Data
Jul. 5, 2014 (DE) .................. 10 2014 109 423

(51) Int. Cl.
*H01R 25/00* (2006.01)
*H01R 13/73* (2006.01)
*H01R 9/26* (2006.01)
*H01R 25/14* (2006.01)

(52) U.S. Cl.
CPC ........... *H01R 13/73* (2013.01); *H01R 9/2608* (2013.01); *H01R 25/142* (2013.01)

(58) Field of Classification Search
CPC ........................................ H01R 13/73
USPC ................................................... 439/121
See application file for complete search history.

(56) References Cited

U.S. PATENT DOCUMENTS

| 3,894,706 A | * | 7/1975 | Mizusawa | F16L 3/1025 248/68.1 |
| 5,118,215 A | * | 6/1992 | Freier | F16L 3/1203 248/316.5 |
| 5,292,013 A | * | 3/1994 | Earl | F16L 3/24 248/224.61 |

(Continued)

FOREIGN PATENT DOCUMENTS

| DE | 202013103753 U1 | 9/2013 |
| WO | WO 8503800 A1 | 8/1985 |

(Continued)

*Primary Examiner* — Tulsidas C Patel
*Assistant Examiner* — Peter G Leigh
(74) *Attorney, Agent, or Firm* — Leydig, Voit & Mayer, Ltd

(57) ABSTRACT

A housing for an electrical connector has a connector for reversibly receiving flexible arms of a clamping element in a locking manner. Further, an assembly has the housing and a clamping element having at least two flexible arms, between which a receiving space is defined, in which the connector of the housing are reversibly held in a locking manner.

10 Claims, 6 Drawing Sheets

(56) References Cited

U.S. PATENT DOCUMENTS

| | | | | |
|---|---|---|---|---|
| 5,334,037 | A | * | 8/1994 | Gabrius ............... H01R 25/142 439/118 |
| 6,059,482 | A | * | 5/2000 | Beauvoir .............. E04B 1/2403 403/187 |
| 6,170,967 | B1 | * | 1/2001 | Usher .................... F21V 23/06 200/227 |
| 7,011,534 | B2 | * | 3/2006 | Shen .................... H01R 25/142 439/116 |
| 7,456,361 | B2 | * | 11/2008 | Hill ......................... H01R 4/48 174/84 C |
| 7,794,132 | B2 | * | 9/2010 | Cunius ................... F21V 17/12 174/110 R |
| 8,469,728 | B1 | * | 6/2013 | Luksic ................ H01R 25/142 439/116 |
| 2007/0049073 | A1 | | 3/2007 | Hill |
| 2008/0084711 | A1 | * | 4/2008 | Chen .................... H01R 13/622 362/648 |
| 2008/0090432 | A1 | * | 4/2008 | Patterson .............. H01R 35/04 439/121 |
| 2008/0112169 | A1 | | 5/2008 | Cunius |
| 2009/0246997 | A1 | * | 10/2009 | Moller ................ H01R 13/502 439/352 |
| 2010/0285690 | A1 | | 11/2010 | Molnar |

FOREIGN PATENT DOCUMENTS

| | | |
|---|---|---|
| WO | WO 9534783 A1 | 12/1995 |
| WO | WO 2005086498 A2 | 9/2005 |
| WO | WO 2010134887 A2 | 11/2010 |

* cited by examiner

HOUSING AND ASSEMBLY

CROSS-REFERENCE TO RELATED APPLICATIONS

This application is a U.S. national stage application under 35 U.S.C. §371 of International Application No. PCT/EP2015/064754, filed on Jun. 29, 2015, and claims benefit to German Patent Application No. DE 10 2014 109 423.9, filed on Jul. 5, 2014. The International Application was published in German on Jan. 14, 2016, as WO 2016/005222 A1 under PCT Article 21(2).

FIELD

The present invention relates to a housing for an electric connector and an assembly having the housing.

BACKGROUND

Housings for electric connectors are employed, for instance, for T-distributors, by means of which the electronic components are incorporated into a bus system. Such T-distributors, also called T-connectors, are known to have at least one branch line via which sensors or actuators are connected to a power line and/or to a data bus line. For purposes of affixing the T-distributors, the plug housings, which are normally T-shaped or double T-shaped, are screwed onto support elements, for example, machine walls or support rails.

A drawback here is that, owing to the usually tight installation space available in the machines, it is hardly or not at all possible to place the plug housings directly in the vicinity of the sensors or actuators that are to be integrated. In order to be able to screw the plug housing onto the support element, a sufficiently large installation space is required, so that manually or electronically operated screwdrivers can be deployed there. Since it is often the case that such a space is not available, the plug housings cannot be attached in the direct vicinity of the sensors or actuators, so that longer cable distances have to be accepted between the plug housings and the electronic components that are to be integrated.

SUMMARY

An aspect of the invention provides a plug housing for an electric connector, the plug housing comprising a connector configured to receive flexible arms of a clamping element. The connector is configured such that a cross section thereof has an at least circular segmented shape along a clamping area into which the clamping element engages when the plug housing is in a fitted state in which it has been fitted onto the clamping element. The connector includes a first and a second external undercut respectively formed on two opposite outer surfaces of the plug housing, a respective one of the flexible arms of the clamping element engaging into each of the external undercuts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
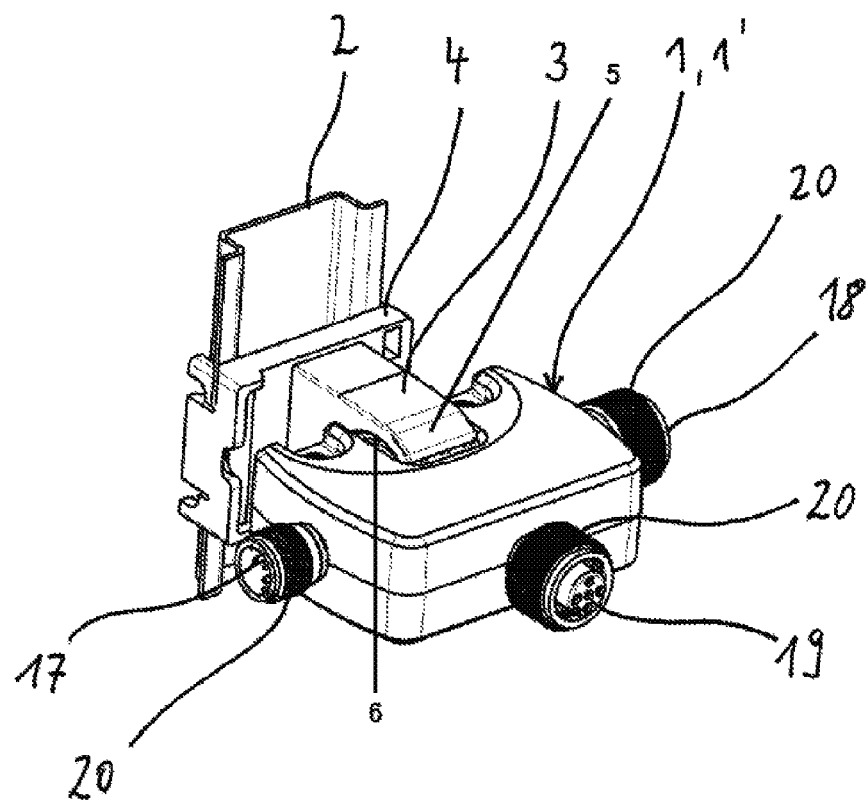
FIG. 1: an assembly according to an embodiment, in a perspective view.

An aspect of the present invention provides a housing for an electric connector that can be easily attached to a support element, even in tight installation spaces.

An aspect of the invention provides a housing for an electric connector of the above-mentioned type in that the housing has connecting means to receive flexible arms of a clamping element so as to latch reversibly.

Therefore, an aspect of the invention is based on the notion of mounting the housing for an electric connector, especially an electric plug housing for an electric plug, onto a support element without the need for tools. Towards this end, the invention proposes for the housing to be configured in such a way that it can be fitted onto a clamping element by means of a detachable latching connection. When it is in its fitted state, the housing is thus detachably locked onto the clamping element by means of a latching connection between the connecting means and the flexible arms of the clamping element. Therefore, according to the invention, a snap connection between the housing and the elastic clamping element is provided which can even be established in tight installation spaces without the need for tools. However, it is also fundamentally conceivable that such a housing is also suitable for mechanical plug-in connectors.

Advantageously, the connecting means have undercuts. The undercuts are indentations or recesses into which the flexible arms of the clamping element engage so as to latch, whereby the material can be indented or recessed in a few spots or over the whole surface and have a rectangular, round, wavy, ribbed or other shape. Advantageously, it is provided for the connecting means to have external undercuts which are formed on two opposite outer surfaces of the housing. In addition or as an alternative, the connecting means can have internal undercuts. In this case, the flexible arms or at least some of the flexible arms of the clamping element can engage into the connecting means so as to latch. Fundamentally, the undercuts provide a stable and yet easy-to-install latching connection with which the housing can be easily fitted onto the clamping element.

According to one aspect of the present invention, it is provided for the connecting means to be configured in such a way that their cross section has an at least circular segmented shape along a clamping area into which the clamping element engages when the housing is in the fitted state in which it has been fitted onto the clamping element. In other words, the connecting means have a cylindrical circumferential surface, at least over a lengthwise section. In this manner, an inexpensive and commercially available pipe clip, which is normally employed for affixing surface-mounted sleeves for electric lines, can be used as the clamping element. The connecting means can also be configured so as to have a completely circular cross section along the clamping area. For instance, the connecting means can be configured so as to be cylindrical and can be enclosed in the housing. A particularly stable and easy-to-install snap connection is attained when the cross section of the connecting elements along the clamping area is configured so as to be more than semicircular and less then completely circular. It is likewise conceivable for the connecting elements to be configured so as to be rectangular, at least along the clamping area.

Advantageously, the connecting means can have at least one rib, especially several ribs, in the clamping area, so that a particularly stiff and tight connection with the clamping element can be created. The at least one rib can preferably extend crosswise from the direction in which the housing is fitted onto the clamping element. In this context, the flexible arms of the clamping element can have recesses that correspond to the ribs in the outer surfaces that come into contact with the clamping area. This reinforces the connection in the axial direction and prevents the housing from slipping sideways when it is in its fitted state.

In a preferred manner, the connecting means have lateral stop surfaces which, between them, define a clamping area into which the clamping element engages when the housing is in the fitted state in which it has been fitted onto the clamping element. This ensures a secure hold of the housing on the clamping element and prevents the housing from slipping axially sideways when it is in its fitted state. The stop surfaces can be used in addition or as an alternative to the ribs in the clamping area.

According to an embodiment, the connecting means can be integral parts of the housing. This provides a particularly stable and tight housing.

According to an embodiment that constitutes an alternative to the integral configuration, the connecting means can be detachably attached to the housing. This provides an especially flexible housing that can be adapted to the particular clamping element that is available at a given time. For instance, the clamping element can be standard commercially available pipe clips. These products are normally available in different sizes and their receiving spaces, which are defined between the flexible arms, have different clamping widths. Therefore, for example, in the case of pipe clips, the connecting means can be used with the clamping area whose outer diameter is suitable for the available pipe clip. For instance, the pipe clip IEC 20, which meets the standards of the International Electrotechnical Commission, has a clamping width of 20 mm, so that the outer diameter of the clamping area of the connecting means should be 20 mm in order to securely lock the housing on the pipe clip 20. Moreover, owing to the design of the detachably attached connecting means, housings can be retrofitted with the connecting means so as to latch reversibly.

According to another aspect of the present invention, it is provided for the housing to have a T-shaped basic form for an electric T-distributor. In this manner, the housing is suitable for T-distributors with which the electronic components are incorporated into a bus system. Such T-distributors, also referred to as T-connectors, have at least one branch line via which sensors or actuators, for example, can be connected to a power line and/or to a data bus line of a bus system. Aside from the T-shaped basic form, it can also be provided, for instance, for the housing to have only one input and one output opening, so that the housing can then have, for instance, a rectangular basic form. The above-mentioned basic forms for the housing must not be construed in a limiting manner since the housing can likewise be round or polygonal and/or can be configured for a plurality of incoming and outgoing, and especially branching, lines.

Another subject matter of the present invention is an assembly for attaching the housing according to the invention. According to the invention, the assembly comprises the above-mentioned housing and a clamping element having at least two flexible arms between which a receiving space is defined into which the connecting means of the housing can be reversibly received so as to latch. Thus, the housing can be easily fitted onto the clamping element. In this context, the flexible arms of the clamping element surround the connection elements and/or engage with them so as to latch.

In a preferred manner, the clamping element is a pipe clip. These can be conventional standard pipe clips which are normally employed for affixing surface-mounted sleeves for electric lines. This translates into an assembly that serves to attach the housing onto a clamping element and that is inexpensive and easy to produce.

According to one aspect of the assembly according to the invention, there is also a support element configured as a support rail, whereby the clamping element is held on the support rail. The clamping element is preferably held detachably on the support rail. Such a support rail can be, for example, a top hat rail or a DIN rail or a profile rail with grooves onto or into which the pipe clip can be fitted or inserted. This translates into an assembly that is particularly easy to create and, even in tight installation spaces, this can easily be effectuated by pushing the housing onto the clamping element. Fundamentally, however, the support element can also be the wall of a machine or some other wall onto which the clamping element, especially the pipe clip, was screwed before the latching connection to the housing was established.

Figure 2:
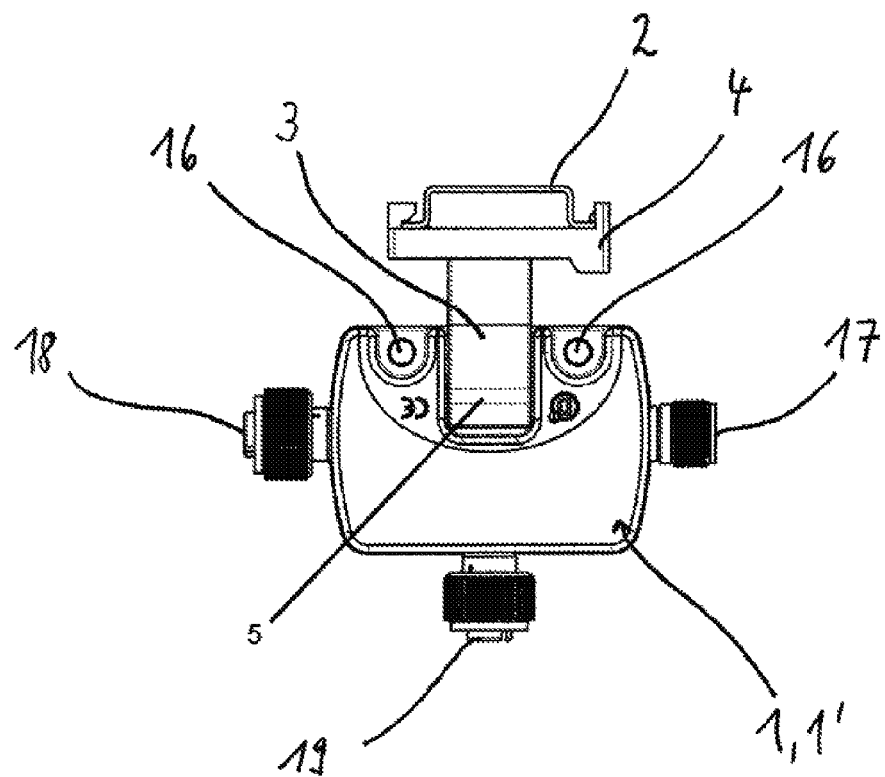
FIG. 2: the assembly from FIG. 1, in another perspective view.
Figure 3:
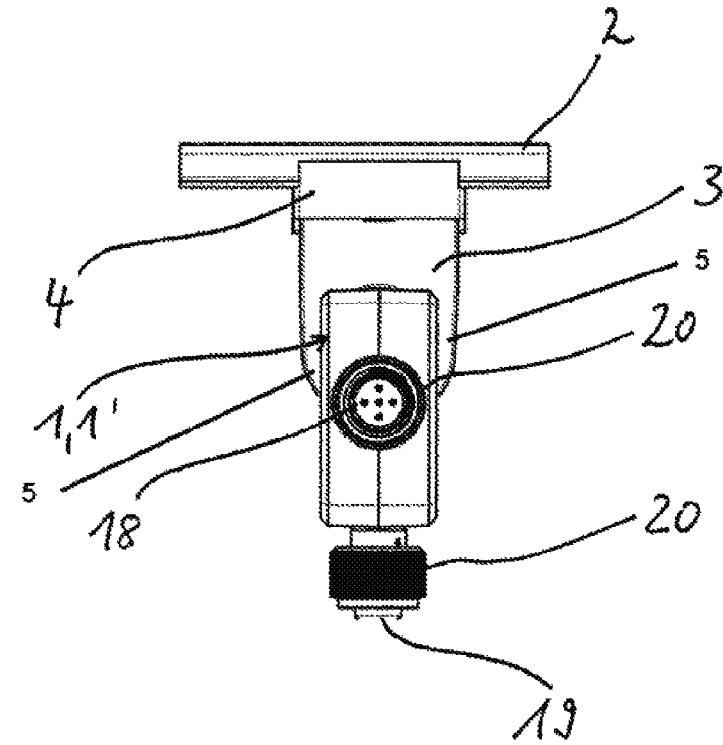
FIG. 3: the assembly from FIG. 1, in yet another perspective view.

FIGS. 1 to 3 show an assembly for attaching a plug housing 1, 1' according to an embodiment of the present invention, as seen from different views. In summary, the assembly serves to attach the plug housing 1, 1', without the need for tools, onto a support element 2 that can be screwed, for instance, onto a wall. The support element 2 is configured here as a top hat rail or as a standardized DIN rail. The plug housing 1, 1' is shown in its fitted state in which the plug housing 1, 1' is fitted onto a clamping element configured as a pipe clip 3. The pipe clip 3 is attached to the top hat rail 2 by means of a holding plate 4.

The pipe clip 3 is a conventional pipe clip of the type normally employed for affixing a surface-mounted electric line. The clip has the familiar two flexible curved arms 5 between which a cylindrical receiving space 6 having a diameter of 20 mm here is defined. In the center between the two arms 5, the pipe clip 3 has a bore in the usual manner through which a screw passes in order to attach the pipe clip 3 to the holding plate 4. The holding plate 4 can be pushed or fitted onto the support rail 2.

Figure 4:
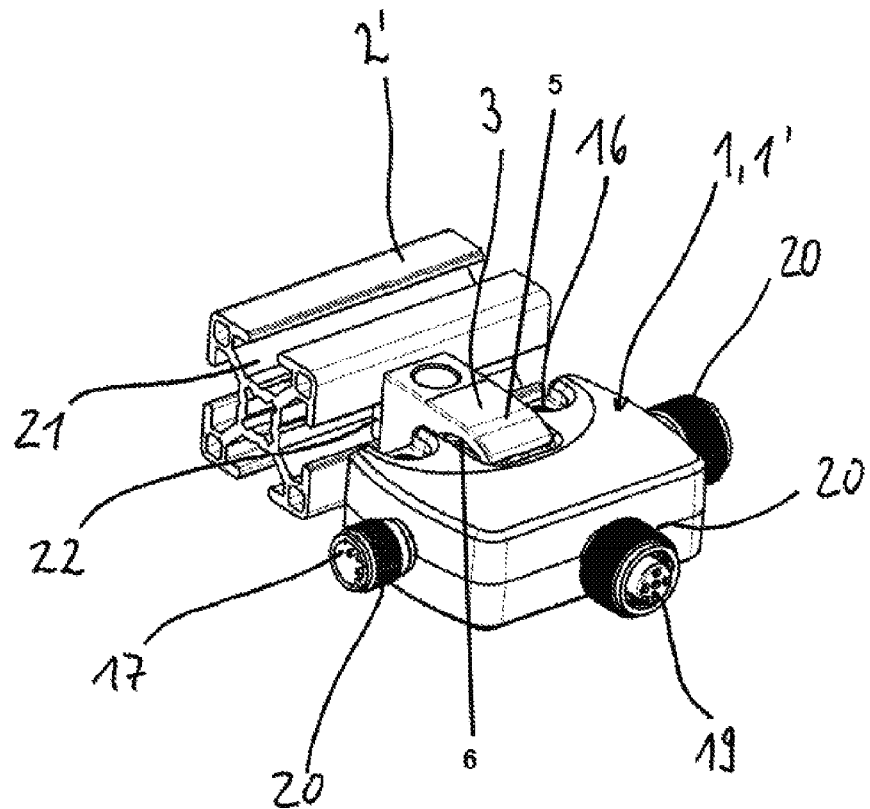
FIG. 4: the assembly from FIG. 1, with an alternative support element, in a perspective view.
Figure 5:
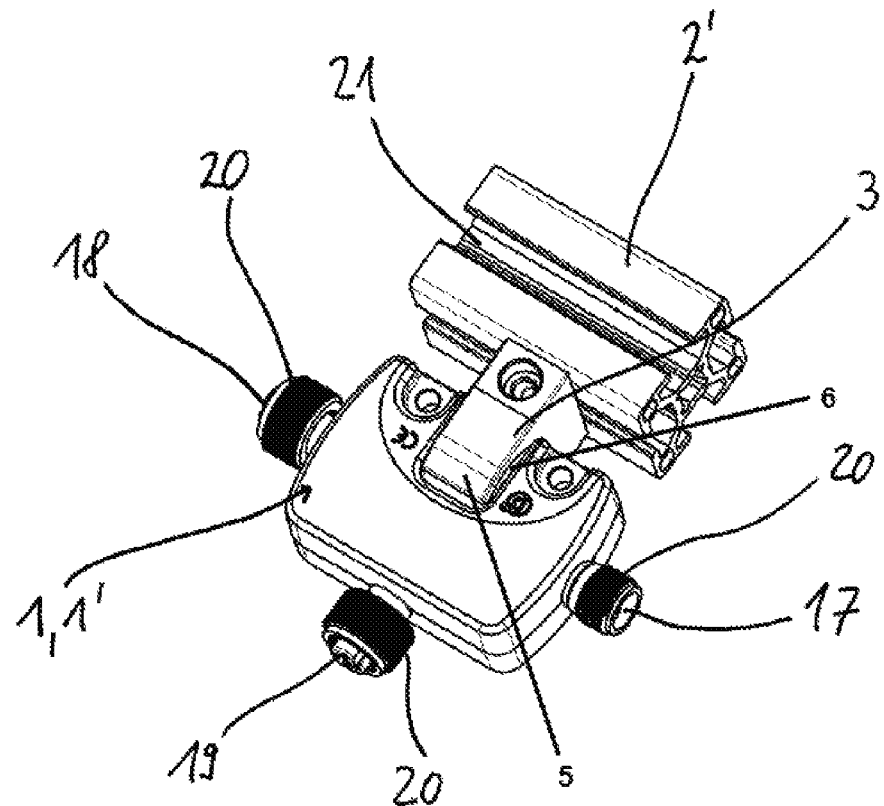
FIG. 5: the assembly from FIG. 4, in another perspective view.
Figure 6:
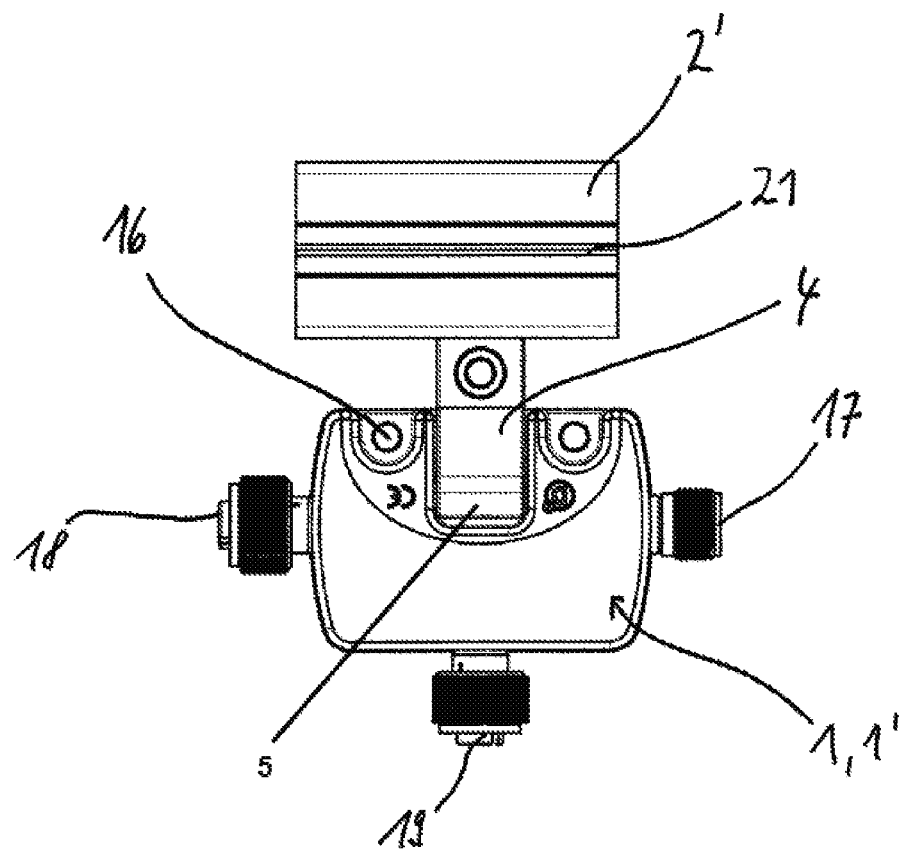
FIG. 6: the assembly from FIG. 4, in yet another perspective view.
Figure 7:
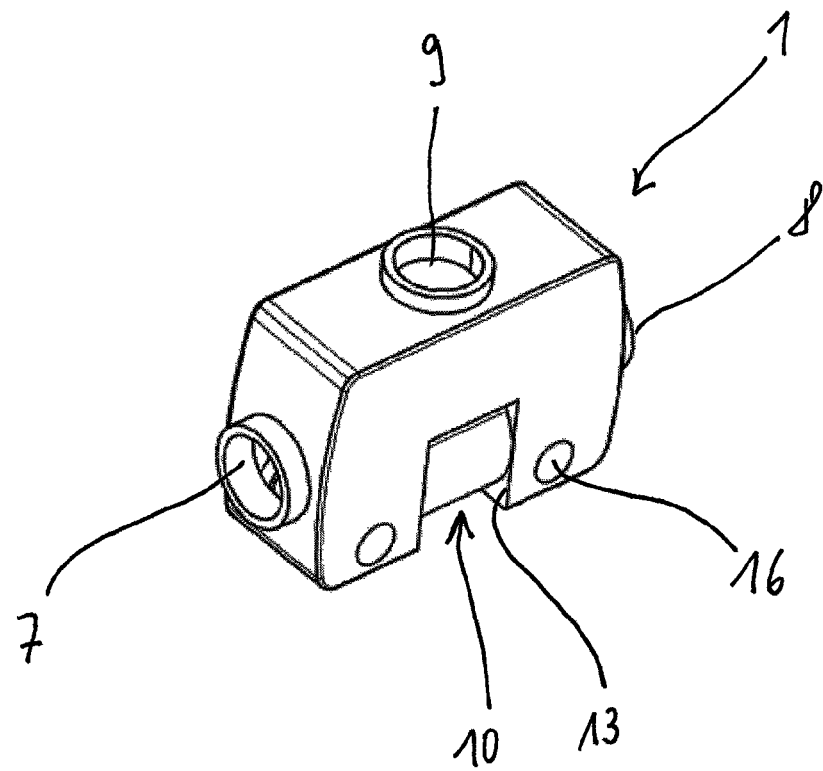
FIG. 7: the housing from FIG. 1, in a first perspective view.
Figure 8:
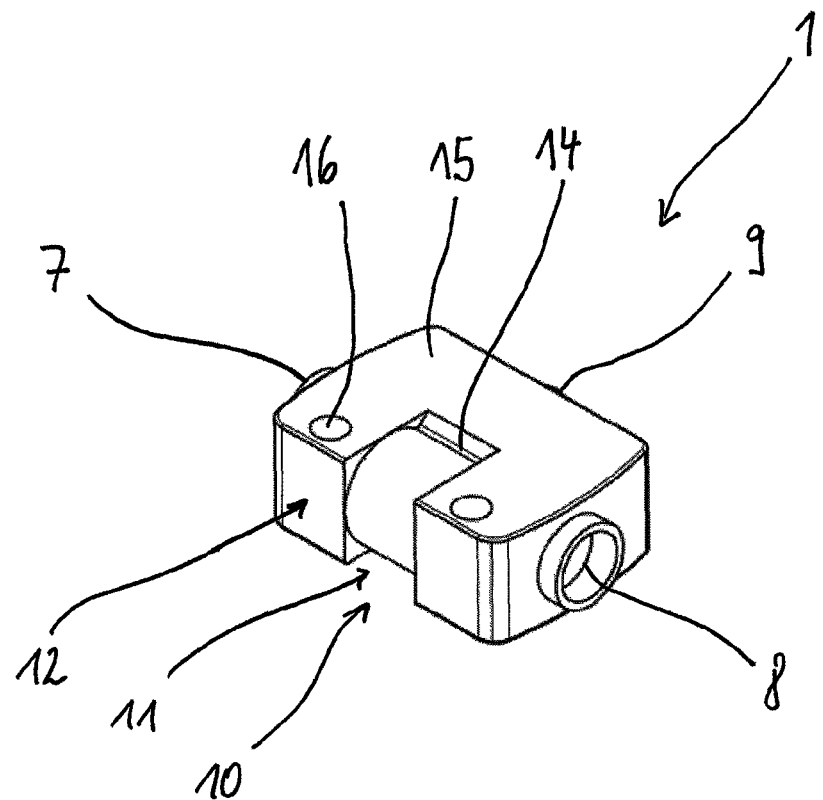
FIG. 8: the housing in a second perspective view.
Figure 9:
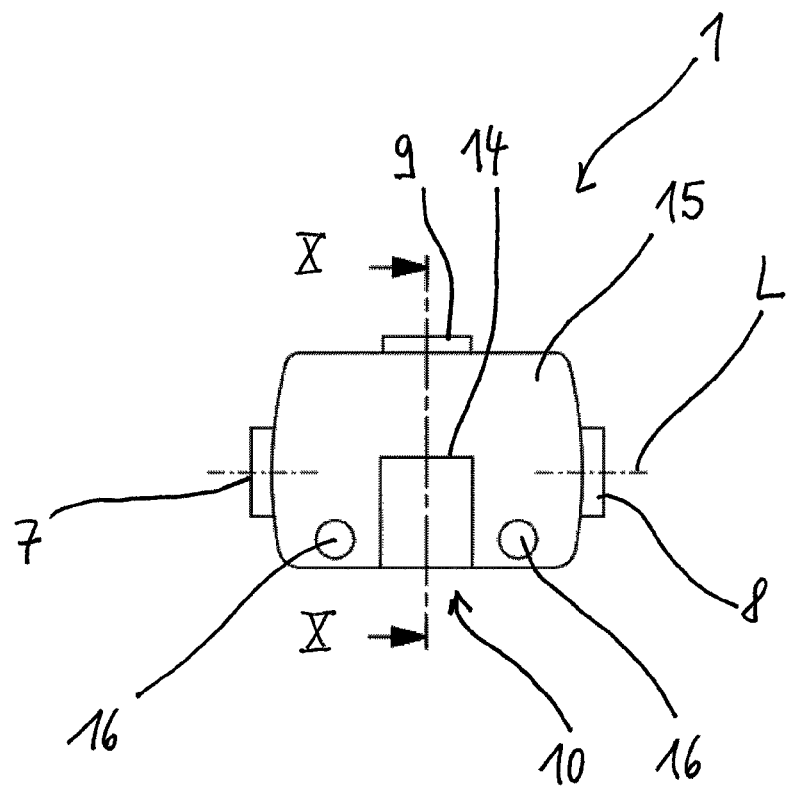
FIG. 9: the housing in a top view.
Figure 10:
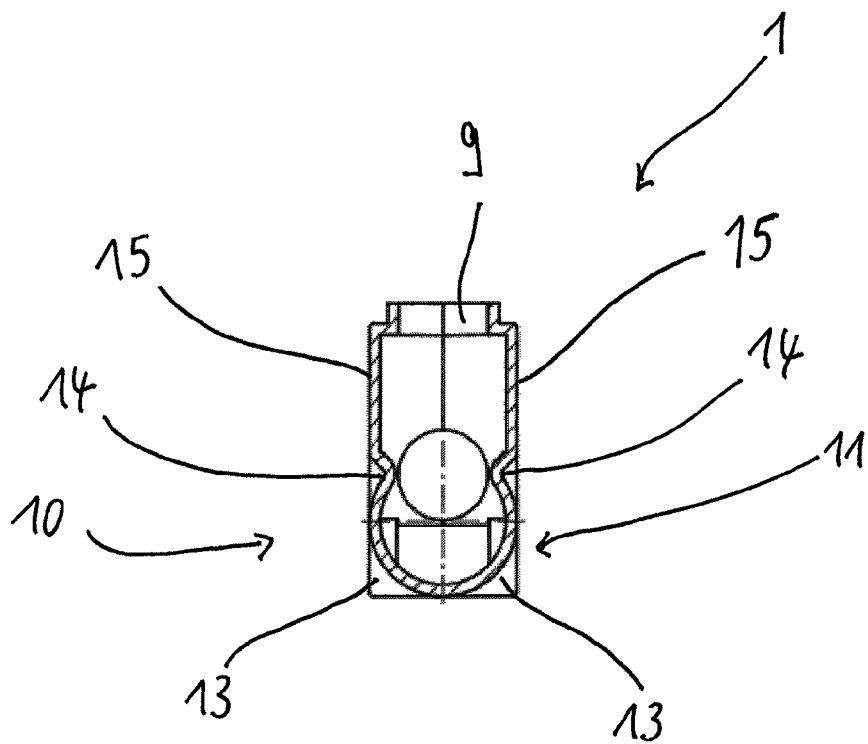
FIG. 10: the housing in a sectional view along line X-X.

FIGS. 4 to 6 show the assembly from FIGS. 1 to 3 with an alternative support element 2', which is not configured as a top hat rail here, but rather as a support rail 2' with four grooves 21 extending in the lengthwise direction. In contrast to the support element configured as a top hat rail, the assembly shown in FIGS. 4 to 6 does not have a holding plate 4 since the end area of the conventional pipe clip 3 facing away from the receiving space 6 has a pedestal 22 by means of which the pipe clip 3 can be inserted into one of the grooves 21 of the support rail 2'.

The further elaborations apply to the embodiments shown in FIGS. 1 to 3 as well as in FIGS. 4 to 6.

FIGS. 7 to 10 show the plug housing 1 according to the invention. Here, it is configured, by way of an example, as a T-shaped plug housing for an electric T-distributor as a component in a bus system. Fundamentally, the plug housing can also have other basic forms. The plug housing 1 here has an input opening 7, an output opening 8 as well as a branch opening 9, whereby plug-in elements 17, 18, 19 of the T-distributor having external threads 20 that serve to hold a plug or a coupler are arranged in the openings 7, 8, 9. For instance, via the built-in plug 17 of the input opening 7 and the bushing 18 of the output opening 8, the T-distributor can be connected to a power supply line and/or to a serial or parallel data line of the bus system in that the plug or the coupler is screwed onto the plug elements 17, 18. For purposes of connecting a sensor or actuator to the T-distributor, a branch line provided with a plug can be screwed onto the plug element 19 that is configured here as a bushing of the branch opening 9. The sensor or actuator can be integrated into the power line and/or data line via the branch line. In this manner, the connected sensor or actuator can be supplied with electric power and/or can receive commands and/or data can be read from the sensor or actuator.

For purposes of latching reversibly with the pipe clip 3, the plug housing 1 has connecting means 10 that are an integral part of the plug housing 1 here. These connecting means 10 are formed in the center between the input and output openings 7, 8 in an area of the plug housing 1 that is located opposite from the branch opening 9. Concretely speaking, the connecting means 10 have a circular segmented clamping area 11 that extends from a side surface 12 of the plug housing 1 that is located opposite from the branch opening 9 all the way to the center of the plug housing 1 on both sides. In the axial lengthwise extension, the clamping area 11 corresponds to the width of the arms 5 of the pipe clip 3. For purposes of axially affixing the plug housing 1 vis-à-vis the pipe clip 3 in the fitted state, the connecting means 10 have two opposite lateral stop surfaces 13 which, between them, delimit the clamping area 11 in the lengthwise direction. As seen in the lengthwise direction, the cross-section of the clamping area 11 forms three-fourths of a circle having a diameter of 20 mm. In the center of the plug housing 1, the connecting means 10 have two external undercuts 14 that are configured on two opposite outer surfaces 15 of the plug housing 1 and that extend parallel to a longitudinal axis L that runs through the input opening 7 and the output opening 8.

In order to attach the plug housing 1 to the pipe clip 3 without the need for tools, the housing is fitted onto the pipe clip 3 so as to latch reversibly. In the fitted state, the arms 5 of the pipe clip 3 surround the clamping area 11 of the plug housing 1 and snap into the undercuts 14.

The plug housing 1 also has two outer through holes 16 by means of which, as an alternative or in addition to the latching connection, the plug housing 1 can be screwed, for example, to the wall of a machine.

Figure 11:
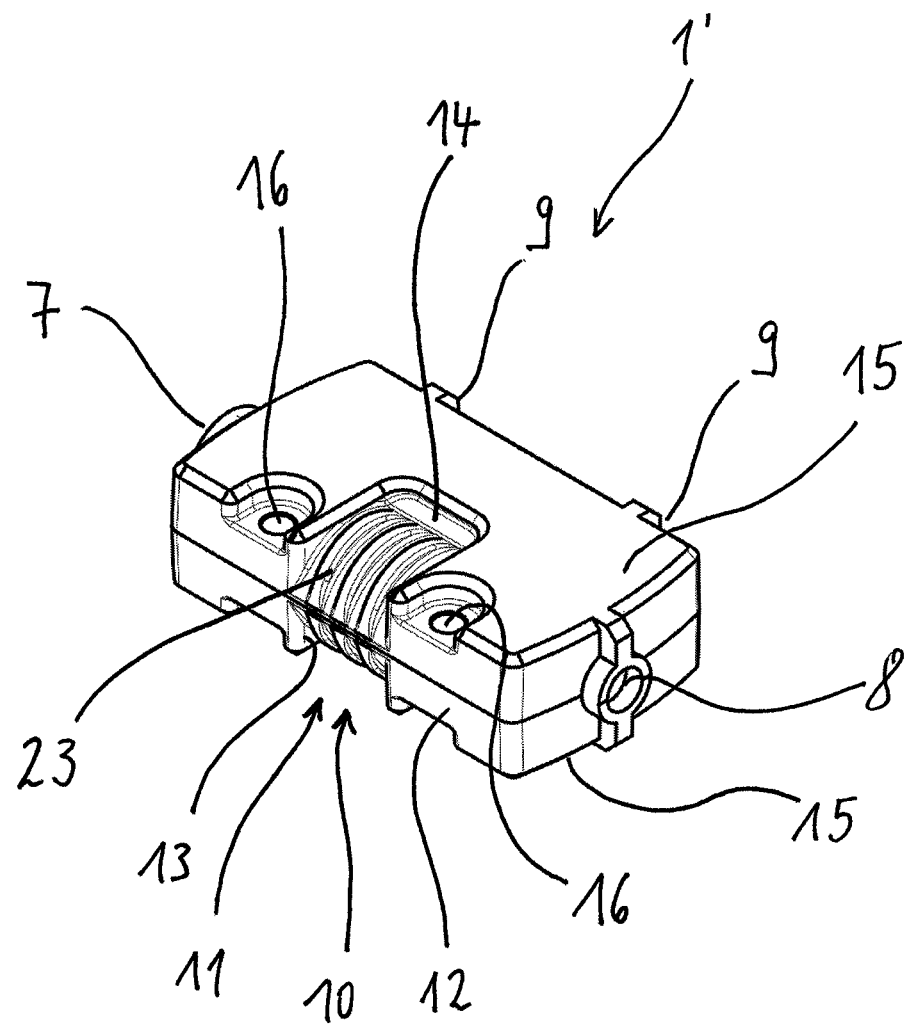
FIG. 11: the housing from FIG. 1 as an alternative to the one shown in FIG. 7, in a perspective view.

FIG. 11 shows an alternative housing 1', whereby components that are the same as those of the housing 1 described above are provided with the same reference numerals.

The alternative housing 1' differs from the housing 1 only in that, for one thing, the alternative housing 1' is configured as a double T-plug housing having two branch openings 9. Consequently, two components, especially sensors or actuators, can be integrated into the power line and/or data line via the double T-distributor. Secondly, the alternative housing 1' differs from the housing 1 in that the clamping area 11 does not have a smooth circumferential surface, but rather a fluted surface with several ribs 23. The ribs 23 extend perpendicular to the longitudinal axis L or in the circumferential direction of the circular segmented clamping area 11. The alternative housing 1' can be fitted onto the pipe clip 3 in a manner analogous to the housing 1, thereby forming the assembly shown in FIGS. 1 to 6. The flexible arms 5 of the clamping element 3 then have outer surfaces that additionally come into contact with the clamping area 11 and that correspond to the ribs 23, so that the arms 5 and the clamping area 11 intermesh with each other like teeth. This means that the clamping connection between the alternative housing 1' and the pipe clip 3 in the axial direction is reinforced even further in comparison to the housing 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1, 1' plug housing
2, 2' support element
3 pipe clip
4 holding plate
5 arm
6 receiving space
7 input opening
8 output opening
9 branch opening
10 connecting means
11 clamping area
12 side surface
13 stop surface
14 undercut
15 outer surface 16 through hole
17 built-in plug
18 bushing
19 bushing
20 external thread
21 groove
22 pedestal
23 rib
L longitudinal axis

The invention claimed is:

1. A plug housing for an electric connector, the plug housing comprising:
   a connector configured to receive flexible arms of a clamping element,
   wherein the connector is configured such that a cross section thereof has an at least circular segmented shape along a clamping area into which the clamping element engages when the plug housing is in a fitted state in which it has been fitted onto the clamping element,
   wherein the connector includes a first and a second external undercut respectively formed on two opposite outer surfaces of the plug housing, a respective one of the flexible arms of the clamping element engaging into each of the external undercuts, and
   wherein the clamping area includes at least one rib into which the clamping element engages when the plug housing is in the fitted state.

2. The plug housing of claim 1, wherein the connector includes a first and a second lateral stop surface which therebetween define the clamping area.

3. The plug housing of claim 1, wherein the connector is an integral part of the plug housing.

4. The plug housing of claim 1, wherein the connector is detachably attached to the plug housing.

5. The plug housing of claim 1, wherein the plug housing has a T-shaped basic form for an electric T-distributor.

6. An assembly, comprising:
   the plug housing of claim 1; and
   the clamping element, wherein the flexible arms of the clamping element include a first and a second flexible arm between which arms a receiving space is defined, into which the connector is reversibly received so as to latch.

7. The assembly of claim 6, wherein the clamping element comprises a pipe clip.

8. The assembly of claim 6, further comprising:
   a support element, configured as a support rail,
   wherein the clamping element is held on the support rail.

9. The plug housing of claim 1, comprising more than one of the connector.

10. The plug housing of claim 1, wherein the at least one rib extends perpendicular to a longitudinal axis of the plug housing that runs through an input opening and an output opening of the housing.

* * * * *